United States Patent Office 2,722,526
Patented Nov. 1, 1955

2,722,526

TRIALKYLPHOSPHITES AS ACID ACCEPTORS IN THE SYNTHESIS OF AMIDES

George Washington Anderson, Darien, and Richard William Young, Stamford, Conn., assignors to American Cyanamid Company, New York, N. Y., a corporation of Maine No Drawing. Application September 24, 1952, Serial No. 311,334

18 Claims. (Cl. 260—112)

This invention relates to an improved method for the preparation of amides and more particularly the invention relates to the use of triphosphites as acid acceptors in amide forming reactions wherein a hydrogen halide is produced as a by-product in the course of the reaction.

A majority of the available procedures for preparing amides result in the elimination of a hydrogen halide during the course of the reaction and in such reactions it is customary to employ a basic material as an acid acceptor. In the past, amine bases were usually employed for this purpose but the use of amine bases as acid acceptors has not been satisfactory in all respects. The primary disadvantage in employing the amine bases as acid acceptors in reactions of this nature is that they result in the introduction into the reaction mixture of an organic hydrochloride salt, the complete removal of which is almost always difficult. The new process of this invention overcomes this disadvantage and results in a reaction mixture free of organic salts, from which the desired amide product can readily be obtained in very pure form.

According to the new process of this invention there is employed as a hydrogen halide acid acceptor in an amide forming reaction conducted under substantially anhydrous conditions, a triphosphite compound represented by one of the following formulas:

$$R_1O-P\begin{matrix}OR_2\\OR_3\end{matrix}$$

or

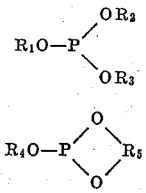

wherein $R_1$, $R_2$ and $R_3$ represent alkyl radicals having not more than about four carbon atoms or alkenyl radicals having not more than about four carbon atoms and having allylic unsaturation; $R_4$ represents an alkyl radical having not more than about four carbon atoms; and $R_5$ represents an alkylene radical having not more than about four carbon atoms. Illustrative alkyl radicals which may be represented by $R_1$, $R_2$, $R_3$ and $R_4$ in the above formulae are methyl, ethyl and n-butyl; illustrative of alkenyl radicals which may be represented by $R_1$, $R_2$ and $R_3$ are allyl and methallyl radicals; and illustrative of alkylene radicals which may be represented by $R_5$ are ethylene and propylene radicals. In other words, it is intended that this invention include the use of tri(lower alkyl)phosphites, tri(lower alkenyl)phosphites wherein the alkenyl groups contain allylic unsaturation and lower alkyl alkylene phosphites. In most instances trimethyl phosphite is preferred, although in some instances the use of triallylphosphite will be found to be advantageous. The trialkylphosphites and the alkyl alkylene phosphites of the above type are for the most part known compounds and can be prepared by known methods.

It has been found that the characteristics of the triphosphites of the above class make them unexpectedly advantageous for use as acid acceptors in amide forming reactions wherein a hydrogen halide is released. It is an advantage of the triphosphite compounds of the above type that they are neutral, stable, covalent organic compounds which do not form stable salts with acids. It is another advantage of the new process of this invention that the triphosphite compounds react with hydrogen halides to give covalent by-products which are easily separated from the desired amide. The trialkylphosphites and the trialkenylphosphites react with hydrogen halides in accordance with the following equation:

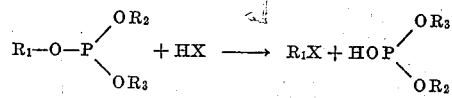

wherein $R_1$, $R_2$ and $R_3$ are as previously defined, and X represents halogen. The alkyl halides resulting from this reaction are in most instances volatile and can be removed from the reaction mixture by distillation. For example, methyl chloride is a gas at room temperature and escapes from the reaction mixture as formed. The diphosphite by-product is water-soluble and does not interfere with the isolation of the amide product. In most instances, the alkyl alkylene phosphites react with the hydrogen halides in accordance with the following equation:

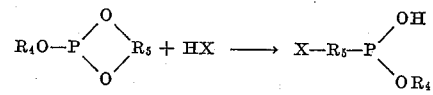

wherein $R_4$, $R_5$ and X are as previously defined. When the reaction follows this course, there is only one by-product and it is, in most instances, readily water-soluble and does not interfere with the isolation of the amide product. Of course, it may be found in some instances that the alkyl alkylene phosphites react, at least partially, to give a lower alkyl halide and an alkalene phosphite but this is not a serious disadvantage.

A further advantage of the new process of this invention is that any excess triphosphite compound can be hydrolyzed at the completion of the reaction to give unobjectionable water-soluble or volatile products of hydrolysis. The trialkylphosphites and the trialkenylphosphites are hydrolyzed in accordance with the following equation:

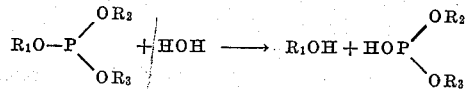

in which $R_1$, $R_2$ and $R_3$ are as previously defined. The alcohol resulting from this reaction is in some instances a low boiling compound which can be, if desired, removed by distillation, but even if not removed, it is usually water-soluble and does not interfere with the isolation of the amide product. The diphosphite is not objectionable, as previously explained. The alkyl alkalene phosphites are usually hydrolyzed in accordance with the following equation:

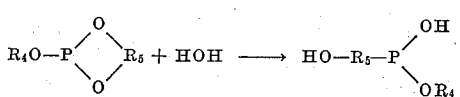

wherein $R_4$ and $R_5$ are as previously defined, so that the only by-product is a diphosphite, the presence of which is not objectionable.

Another unexpected advantage of the new process is that it has in some instances been found to reduce racemization in amide forming reactions. Still further advantages will be apparent from the following description of the invention.

The new improvement of this invention is broadly useful in any amide forming reaction wherein a hydrogen halide is evolved as a by-product. It finds its greatest utility in reactions wherein a carboxylic acid is reacted with an amine in the presence of a halide condensing agent as illustrated by dihaloalkylphosphites, dialkylhalophosphites, dialkylhaloarsenites, phosphorus trihalides, phosphorus oxyhalides, and thionyl halides. In reactions employing such halides it has been found that the triphosphite compound reacts with the hydrogen halide which is formed at approximately the same rate as produced so that at all times the reaction mixture is maintained substantially free of hydrogen halides. The new improvement can also be employed in other amide forming reactions resulting in the production of a hydrogen halide, for instance where carboxylic acid halides are employed as reagents or where amine salts of hydrogen halide acids are employed as reagents, although in such reactions it may sometimes be found that the degree of improvement is not comparable to that obtained in reactions where a halide condensing agent is employed. In the case of reactions employing a carboxylic acid halide, less impressive results may be obtained as a result of a slow secondary reaction of the carboxylic acid halide with the triphosphite, and in the case of reactions employing an amine salt, it may be found that the hydrogen halide is produced in the reaction mixture somewhat faster than it is removed by the triphosphite acid acceptor.

The reaction conditions employed with the new improved process of this invention will for the most part depend upon the particular amide forming reaction concerned since the triphosphite compounds are relatively stable and can be employed under any conditions at which an amide forming reaction is ordinarily conducted. It will usually be advantageous to use temperatures above about −10° C. because the reaction rate of the triphosphite compound with the halogen acid is increased by higher temperatures. On the other hand, with the lower boiling trialkylphosphites, one may be limited as a matter of convenience to the boiling point of the phosphite. For instance, trimethylphosphite boils at about 112° C. and as a matter of convenience the reaction will not ordinarily be performed above such temperatures. The triphosphites may, if desired, be employed as acid acceptors in reactions where inert solvents are employed although in most instances the triphosphites are capable of acting as solvents themselves, and the use of a solvent may be avoided even though one is ordinarily advantageous. Of course, the triphosphites should only be used in reactions conducted under substantially anhydrous conditions since they are slowly hydrolyzed if employed in the presence of water.

The invention will be more particularly illustrated by the following examples showing the use of various triphosphites as acid acceptors in vairous amide forming reactions:

Example 1

2.09 g. of carbobenzoxyglycine and 2.30 g. of ethyl DL-phenylalaninate hydrochloride were suspended in 10 cc. of triethylphosphite and to this mixture there was added 1.2 g. of dichloroethylphosphite. The resulting suspension was heated on a steam bath for 30 minutes. There was then added 40 cc. of water and the solution cooled. The resulting crystals of ethyl carbobenzoxyglycyl-DL-phenylalaninate were separated and washed with 10 cc. of water, 15 cc. of half saturated sodium bicarbonate solution and then again with water. The yield was 75% of theoretical of a product having a melting point of about 82–91° C.

Example 2

Example 1 was repeated except that heating was conducted for only fifteen minutes. The yield of ethyl carbobenzoxyglycyl-DL-phenylalaninate was approximately 65% of theoretical of a product having a melting point of about 83–89° C.

Example 3

Example 2 was repeated except that only 5 cc. of triethyl phosphite and 0.8 g. of dichloroethylphosphite were employed. The yield of ethyl carbobenzoxyglycyl-DL-phenylalaninate was approximately 69% of theoretical of a product having a melting point of about 85–92° C.

Example 4

Example 1 was repeated except that only 5 cc. of triethylphosphite were employed. The yield of ethyl carbobenzoxyglycyl-DL-phenylalaninate was approximately 65%, the product having a melting point of about 85–90° C.

Example 5

Example 4 was repeated except that only 0.8 g. of dichloroethylphosphite was employed. The yield of ethyl carbobenzoxyglycyl-DL-phenylalaninate was approximately 85% of theoretical of a product having a melting point of about 85–91° C.

Example 6

Example 5 was repeated except that carbobenzoxyglycine was not added until the other ingredients of the reaction mixture had been heated for 30 minutes and the heating was then continued for an additional 10 minutes. The yield was substantially the same as in Example 5.

Example 7

Example 6 was repeated except that 10 cc. of triethylphosphite and 5 cc. of diethylphosphite were employed in place of the 5 cc. of triethylphosphite in Example 6. The yield was substantially the same.

Example 8

Example 1 was repeated except that only .8 g. of dichloroethylphosphite was employed. The yield of ethyl carbobenzoxyglycyl-DL-phenylalaninate was approximately 85%, the product having a melting point of about 86–91° C.

Example 9

Example 8 was repeated except that the reaction mixture was heated 45 minutes. The yield was substantially the same as in Example 8.

Example 10

Example 8 was repeated except that the reaction mixture was heated for 1 hour. Again the yield was substantially the same as in Example 8.

Example 11

Example 8 was repeated except that the reaction mixture was heated 15 minutes. The yield of ethyl carbobenzoxyglycyl-DL-phenylalaninate was approximately 73% of theoretical, the product having a melting point of about 83–89° C.

Example 12

Example 5 was repeated except that 5 cc. of triamethylphosphite was employed in place of the triethylphosphite of Example 3. The yield was approximately 95% of theoretical, the product having a melting point of from about 88–91° C.

Example 13

Example 12 was repeated except that the reaction mixture was heated for 15 minutes instead of 30 minutes. The yield of ethyl carbobenzoxyglycyl-DL-phenylalaninate was approximately the same as in Example 12.

Example 14

Example 3 was repeated except that 5 cc. of triallylphosphite were employed in place of the triethylphosphite of Example 3. The yield was approximately 92% of theoretical of a product having a melting point of about 86–89° C.

Example 15

Example 14 was repeated except that 5 cc. of triallylphosphite and 5 cc. of diethylphosphite were employed. The yield of ethyl carbobenzoxyglycyl-DL-phenylalaninate was substantially the same as in Example 14.

Example 16

Example 14 was repeated except that the reaction mixture was heated for 30 minutes before the addition of the carbobenzoxyglycine and thereafter heated an additional 15 minutes. The yield was approximately 93% of theoretical of a product having a melting point of about 86–89° C.

Example 17

Example 14 was repeated except that the reaction mixture was heated 26 minutes and the dichloroethylphosphite was added in 3 portions over a 3 minute period. The yield was substantially the same as in Example 14.

Example 18

Example 14 was repeated except that the reaction mixture was heated for only 5 minutes. The yield of ethyl carbobenzoxyglycyl - DL - phenylalaninate was approximately 75% of theoretical, the product having a melting point of 82–90° C.

Example 19

Example 1 was repeated except that 1.8 g. of o-phenylenechlorophosphite was employed in place of the dichloroethylphosphite of Example 1. The yield of ethyl carbobenzoxyglycyl - DL - phenylalaninate was approximately 65% of theoretical, the product having a melting point of 87–89° C.

Example 20

Example 1 was repeated except that 0.5 g. of phosphorus trichloride were employed in place of the dichloroethylphosphite of Example 1. The yield of ethyl carbobenzoxyglycyl - DL - phenylalaninate was approximately 74% of theoretical of a crude product having a melting point of approximately 77–78° C. After recrystallization, the yield was approximately 52% of theoretical of a product having a melting point of about 88–89° C.

Example 21

Example 20 was repeated except that 1.5 g. of phosphorus tribromide were employed in place of the phosphorus trichloride of Example 20. The yield after recrystallization was approximately 27% of theoretical of a product having a melting point of about 89–92° C.

Example 22

In 5 cc. of triethylphosphite there were suspended 2.05 g. of phthaloylglycine and 1.96 g. of ethyl L-leucinate hydrochloride and to this mixture there was added 0.7 cc. of dichloroethylphosphite. The suspension was warmed on a steam bath for 30 minutes, 40 cc. of water added and the resulting mixture cooled. There was obtained ethyl phthaloylglycyl-L-leucinate having a melting point of about 141–143° C. in a yield of approximately 88% of theoretical.

Example 23

Example 22 was repeated except that 5 cc. of trimethylphosphite were employed in place of the triethylphosphite of Example 22. The yield was approximately 93% of theoretical of a product having a melting point of about 143–145° C.

Example 24

In 5 cc. of trimethylphosphite there were suspended 2.05 g. of phthaloylgylcine and 1.4 g. of ethyl glycinate hydrochloride and the resulting suspension was heated with 0.7 cc. of dichloroethylphosphite for 4.5 minutes. After dilution with 40 cc. of water and cooling, the resulting crystals of ethyl phthaloylglycylglycinate were separated to give a yield of 92% of a material melting at about 195–197° C.

Example 25

Example 24 was repeated except that an equal molar quantity of ethyl glycinate hydrobromide was substituted for the ethyl glycinate hydrochloride of Example 24. The yield of ethyl phthaloylglycylglycinate was substantially the same.

Example 26

In 5 cc. of trimethylphosphite there were suspended 2.09 g. of carbobenzoxyglycine and 2.09 g. of ethyl L-tyrosinate hydrochloride. To this suspension there was added 0.7 cc. of dichloroethylphosphite and the resulting mixture heated for 30 minutes on a steam bath. After the addition of 40 cc. of water and cooling, the resulting crystals of ethyl carbobenzoxyglycyl-L-tyrosinate were separated to give a yield of about 60% of theoretical.

Example 27

Example 26 was repeated except that 0.5 cc. of dichloromethylphosphite was employed in place of the dichloroethylphosphite of Example 26. The yield of ethyl carbobenzoxyglycyl-L-tyrosinate was approximately the same.

Example 28

Example 27 was repeated except that 1 cc. of dichloromethylphosphite was employed. The yield of ethyl carbobenzoxyglycyl-L-tyrosinate was approximately 85%.

Example 29

In 5 cc. of trimethylphosphite there were suspended 2.95 g. of phthaloyl-DL-phenylalanine and 1.4 g. of ethyl glycinate hydrochloride. To the resulting suspension there were added 0.7 cc. of dichloroethylphosphite and the resulting mixture heated for 30 minutes on the steam bath. There was then added 40 cc. of water and the resulting solution cooled. The resulting crystalline material was separated to give a yield of ethyl phthaloyl-DL-phenylalanylglycinate of approximately 98% of theoretical. The product had a melting point of about 148–152° C.

Example 30

Example 29 was repeated except that phthaloyl-L-phenylalanine was employed. The yield of crude ethyl phthaloyl - L - phenylalanylglycinate was approximately 92% of theoretical and had a melting point of 154–157° C. On recrystallization, the melting point was raised to 159–160° C. and the material had a rotation of $[\alpha]_D^{25} -114°$ (c,2; ethanol).

Example 31

In 5 cc. of trimethylphosphite there were suspended 3.22 g. of carbobenzoxy-L-leucylglycine and 1.4 g. of ethyl glycinate hydrochloride. To the resulting suspension there was added 0.77 cc. of dichloroethylphosphite and the resulting mixture heated on a steam bath for 15 minutes. There was then added 40 cc. of water and the mixture cooled to give crystalline ethyl carbobenzoxy-L-leucylglycylglycinate in 79% yield. After purification by two recrystallizations from ethyl acetate-petroleum ether the melting point was about 104–106° C.

Example 32

In 10 cc. of trimethylphosphite there were suspended 6.0 g. of carbobenzoxyphenylalanine and 2.8 g. of ethyl glycinate hydrochloride. There was then added 1.4 cc. of dichloroethylphosphite and the resulting mixture heated for 25 minutes on a steam bath. After dilution with 40 cc. of water and cooling, there was obtained a yield of approximately 89% of theoretical of ethyl carbobenzoxy-DL-phenylalanylglycinate. After recrystallization from ethyl acetate-petroleum ether, the material had a melting point of about 97–99° C.

Example 33

To 5 cc. of triethylphosphite there were added 1.22 g. of benzoic acid, 0.93 g. of aniline and 0.7 cc. of dichloroethylphosphite, and the resulting mixture was heated on a steam bath for 30 minutes. After dilution with 40 cc. of water and cooling, there was obtained benzanilide in a 71% yield.

Example 34

Example 33 was repeated except that 0.5 g. of phosphorus trichloride was substituted for the dichloroethylphosphite of Example 33. Benzanilide was obtained in a yield of approximately 36% of theoretical.

Example 35

Example 33 was repeated except that the mixture was heated 3 hours in place of 30 minutes. A yield of approximately 91% of theoretical was obtained.

Example 36

To 5 cc. of triethylphosphite there were added 0.60 g. of acetic acid and 0.93 g. of aniline. There was then added 0.7 cc. of dischloroethylphosphite and the resulting mixture heated on the steam bath for ½ hour. After the addition of 40 cc. of water and cooling, acetanilide was obtained in a yield of approximately 74% of theoretical.

Example 37

Example 36 was repeated except that 0.01 mol of salicyclic acid was employed in place of the acetic acid of Example 36. Salicylanilide was obtained in a yield of approximately 65% of theoretical.

Example 38

In 5 cc. of triethyl phosphite there were suspended 1.46 g. of adipic acid, 1.86 g. of aniline and 1.4 cc. of dichloroethylphosphite. The resulting mixture was heated on a steam bath but since the suspension failed to clear, it was heated a few minutes over an open flame to obtain complete solution and then returned to the steam bath for approximately 20 minutes. After the addition of 40 cc. of water and cooling, crude adipyldianilide was obtained in approximately 79% yield. Recrystallization gave a yield of approximately 69% of a material having a melting point of 235–240° C.

Example 39

To 5 cc. of triethylphosphite there were added 1.22 g. of benzoic acid, 1.43 g. of naphthylamine and 0.7 cc. of dichloroethylphosphite. The resulting suspension was heated for 30 minutes on a steam bath, diluted with 40 cc. of water and cooled to give a yield of approximately 13% of crude benzoyl-α-naphthylamine.

Example 40

To 5 cc. of triethylphosphite there were added 1.22 g. of benzoic acid, 0.99 g. of cyclohexylamine and 0.7 cc. of dichloroethylphosphite and the resulting mixture warmed on a steam bath for 30 minutes. Since all solids failed to dissolve, the flask was removed to an open flame for a few minutes and then returned to the steam bath for a total heating period of 40 minutes. After dilution with 40 cc. of water and cooling, crude benzoylcyclohexylamine was obtained in approximately 68% yield.

Example 41

To 5 cc. of triethylphosphite there were added 0.94 g. of chloroacetic acid, 1.07 g. of p-toluidine and 0.7 cc. of dichloroethylphosphite and the resulting mixture heated on the steam bath for 40 minutes. After dilution with 40 cc. of water and cooling, crude chloracetyl-p-toluide was obtained in an approximately 70% yield.

Example 42

To 5 cc. of triethylphosphite there were added 0.6 g. of acetic acid, 1.38 g. of p-nitroaniline and 0.7 cc. of dichloroethylphosphite and then the mixture was heated for 30 minutes on a steam bath. After the addition of 40 cc. of water and cooling, crude acetyl-p-nitroanilide was obtained in an approximately 73% yield.

Example 43

To 5 cc. of triethylphosphite there were added 1.23 g. of nicotinic acid, 1.07 g. of toluidine and 0.7 cc. of dichloroethylphosphite. The resulting mixture was heated on a steam bath for 30 minutes but the use of a free flame was required for a complete solution of the reactants. There was then added 40 cc. of water, the reaction mixture neutralized by the addition of sodium bicarbonate solution and cooled. A yield of about 85% of crude nicotinic acid p-toluide was obtained.

Example 44

To 5 cc. of triethylphosphite there were added 1.22 g. of benzoic acid, 0.94 g. of alpha-aminopyridine and 0.7 cc. of dichloroethylphosphite and the resulting mixture heated on a steam bath for 30 minutes. After dilution and neutralization as in Example 43, an approximately 8% yield of crude benzoyl-α-aminopyridine was obtained.

Example 45

To 5 cc. of methyl ethylene phosphite there were added 2.09 g. of carbobenzoxyglycine, 2.30 g. of ethyl phenylalaninate hydrochloride and 0.7 cc. of dichloroethylphosphite. The resulting mixture was heated on a steam bath for 15 minutes, diluted with 40 cc. of water and cooled. The resulting crystals of ethyl carbobenzoxyglycyl-DL-phenylalaninate were separated and dried for a yield of 76% of theoretical of a material having a melting point of about 86–91° C.

The above examples illustrate the new improvement of this invention in amide forming reactions wherein a chloride condensing agent is employed. The improvement will now be illustrated in amide forming reactions where other types of condensing agents are employed or where no condensing agent of any type is used.

Example 46

To 5 cc. of triethylphosphite there were added 1.41 g. of benzoyl chloride and .93 g. of aniline, and the resulting mixture was heated on a steam bath for 30 minutes. Dilution of the mixture with 40 cc. of water and cooling gave crystals of benzanilide in a yield of approximately 57% of theoretical.

Example 47

In 7 cc. of diethylphosphite there were dissolved 2.09 g. of carbobenzoxyglycine and 2.30 g. of ethyl DL-phenylalaninate hydrochloride and to the resulting solution there was added 1.7 cc. of triethylphosphite and 2.84 g. of tetraethylpyrophosphite. The resulting solution was then heated on a steam bath for 15 minutes after which time it was diluted with 15 cc. of water, chilled and seeded. The resulting white crystals of ethyl carbobenzoxyglycyl-DL-phenylalaninate were washed successively with water, 5% bicarbonate solution and again with water. The dried crystals weighed approximately 2.0 g. for a yield of 75% of theoretical, the material melting at about 89–90° C.

Example 48

Example 47 was repeated except that the tetraethylpyrophosphite was omitted. A 20% yield was obtained.

Example 49

Example 47 was repeated except that 3.4 cc. of triethylphosphite were employed. An 82% yield was obtained.

Example 50

Example 49 was repeated except that the diethylphosphite was omitted and the triethylphosphite allowed to act as a solvent. A 90% yield was obtained.

*Example 51*

Example 50 was repeated except that 5.1 cc. of triethylphosphite were employed. The yield was approximately the same.

*Example 52*

Example 47 was repeated except that an equal molar quantity of trimethylphosphite was employed in place of the triethylphosphite of Example 47 and the reaction mixture was allowed to sit for 20 hours at room temperature in place of heating. A 74% yield of ethyl carbobenzoxyglycyl-DL-phenylalaninate was obtained.

*Example 53*

Example 52 was repeated except that the reaction mixture was heated at 58° C. for 1 hour. A 63% yield of ethyl carbobenzoxyglycyl-DL-phenylalaninate was obtained.

*Example 54*

To 5 cc. of triethylphosphite there were added 2.09 g. of carbobenzoxyglycine, 1.82 g. of methyl L-leucinate hydrochloride and 2.84 g. of tetraethylpyrophosphite, and the resulting mixture was warmed on a steam bath for 15 minutes. Upon the addition of 25 cc. of water, a colorless oil was precipitated and extracted into ether. The ether was washed with water and bicarbonate solution, dried with sodium sulfate and concentrated. The oil crystallized to give a 78% yield of crude methyl carbobenzoxyglycyl-L-leucinate which was purified by recrystallization from ether-petroleum ether.

*Example 55*

Example 54 was repeated except that an equal molar quantity of trimethylphosphite was employed in place of the triethylphosphite of Example 54. A yield of about 90% of methyl carbobenzoxyglycyl-L-leucinate was obtained.

We claim:

1. In an amide forming reaction conducted under substantially anhydrous conditions wherein a hydrogen halide is evolved as a reaction by-product, the improvement which comprises employing as an acid acceptor a triphosphite selected from the group consisting of tri(lower alkyl)phosphites, tri(lower alkenyl)phosphites having allylic unsaturation, and lower alkyl alkylene phosphites.

2. The method of claim 1 wherein the triphosphite is a trialkylphosphite.

3. The method of claim 2 wherein the trialkylphosphite is trimethylphosphite.

4. The method of claim 2 wherein the trialkylphosphite is triethylphosphite.

5. The method of claim 1 wherein the triphosphite is triallylphospite.

6. In an amide forming reaction conducted under substantially anhydrous conditions wherein a carboxylic acid is condensed, in the presence of a halide condensing agent, with a member of the group consisting of amines and amine salts, the improvement which comprises employing as an acid acceptor a triphosphite selected from the group consisting of tri(lower alkyl)phosphites, tri(lower alkenyl)phosphites having allylic unsaturation, and lower alkyl alkylene phosphites.

7. The method of claim 6 wherein the triphosphite is a trialkylphosphite.

8. The method of claim 7 wherein the trialkylphosphite is trimethylphosphite.

9. The method of claim 7 wherein the trialkylphosphite is triethylphosphite.

10. The method of claim 6 wherein the triphosphite is a trialkenylphosphite having allylic unsaturation.

11. The method of claim 10 wherein the trialkenylphosphite is triallylphosphite.

12. The method of claim 6 wherein the triphosphite is a lower alkyl alkylene phosphite.

13. The method of claim 12 wherein the alkyl alkylene phosphite is methyl ethylene phosphite.

14. The method of claim 6 wherein the halide condensing agent is a phosphorus halide condensing agent.

15. The method of claim 14 wherein the phosphorus halide condensing agent is a di(lower alkyl)chlorophosphite and the triphosphite is a tri(lower alkyl)phosphite.

16. The method of claim 15 wherein the triphosphite is trimethylphosphite.

17. The method of claim 6 wherein the halide condensing agent is a dichloro(lower alkyl)phosphite and the triphosphite is a tri(lower alkyl)phosphite.

18. The method of claim 17 wherein the tri(lower alkyl)phosphite is trimethylphosphite.

References Cited in the file of this patent

UNITED STATES PATENTS

| 2,316,215 | Austin | Apr. 13, 1943 |
| 2,404,503 | Kharasch et al. | July 23, 1946 |
| 2,484,477 | Weissberger et al. | Oct. 11, 1949 |

OTHER REFERENCES

Gerrard et al.: Chem. Abstracts, vol. 42, col. 7147 (1948).

Berlak et al.: J. Chem. Soc., vol. 1949, pp. 2039–12.

Kosolapoff: "Organo Phosphorus Compounds" (Wiley), pp. 192–8 (1950).